United States Patent [19]

Kesten

[11] Patent Number: 4,507,996
[45] Date of Patent: Apr. 2, 1985

[54] DEVICE FOR TRANSFERRING AND MONITORING LOAD TO DIE ROLL

[75] Inventor: Martin Kesten, West Hartford, Conn.

[73] Assignee: Preston Engravers, Inc., Windsor, Conn.

[21] Appl. No.: 441,638

[22] Filed: Nov. 15, 1982

[51] Int. Cl.³ .............................................. B26D 1/42
[52] U.S. Cl. ........................................ 83/344; 83/346
[58] Field of Search ................ 83/344, 346, 347, 522; 72/20, 19; 100/99

[56] References Cited

U.S. PATENT DOCUMENTS

| | | | |
|---|---|---|---|
| 2,358,269 | 9/1944 | Wemhoner | 72/20 |
| 2,765,731 | 10/1956 | Edwards | 100/99 |
| 3,276,306 | 10/1966 | Winkler | 83/346 X |
| 3,286,495 | 11/1966 | Diolot | 72/20 X |
| 3,394,566 | 7/1968 | O'Brien | 100/99 X |
| 3,427,839 | 2/1969 | Neumann | 72/20 |
| 3,826,165 | 7/1974 | Currie | 83/346 X |
| 4,095,498 | 6/1978 | Biggar | 83/346 |
| 4,137,741 | 2/1979 | Fapiano et al. | 72/19 X |
| 4,355,554 | 10/1982 | Gregory | 83/346 X |

Primary Examiner—James M. Meister

[57] ABSTRACT

A device for transferring and monitoring the load applied to a die cutting roll in a press has a pressure indicator for registering applied force. By utilizing an elongated member having such a pressure indicator adjacent each of its opposite ends, or by utilizing two such devices with an assist roller mounted therebetween, the force applied to the opposite ends of the underlying die roll can readily be determined, and adjusted if necessary. The load-bearing members of the device preferably comprise a diaphragm mounted on the body in sealing relationship over a recess, to which the pressure indicator is operatively connected.

7 Claims, 6 Drawing Figures

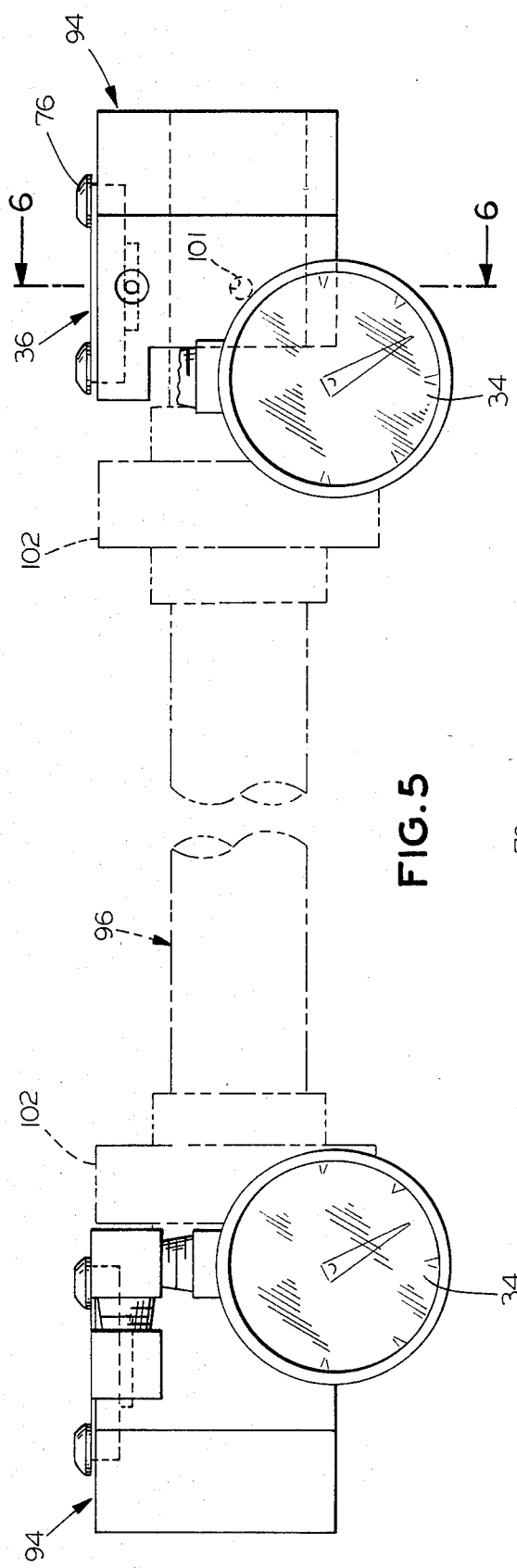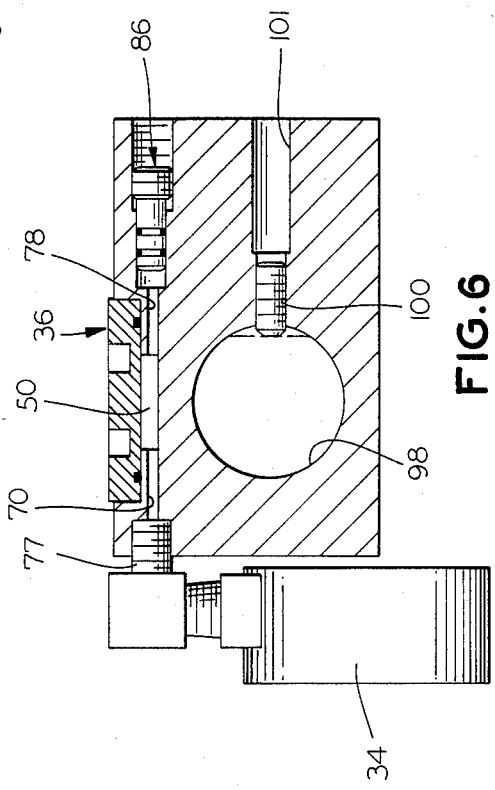

DEVICE FOR TRANSFERRING AND MONITORING LOAD TO DIE ROLL

BACKGROUND OF THE INVENTION

The die rolls utilized for continuous rotary die cutting of web materials must be manufactured with a high degree of accuracy, to ensure smooth and true running in the die-cutting press and to produce work of good quality over extended periods of time; such rolls are therefore quite expensive. It is moreover essential that the die cutting roll be accurately positioned in the press and subjected to balanced loading, since otherwise performance will be unsatisfactory and the rate of die wear will be excessive.

Such rotary dies normally consist of a cylindrical body portion with annular bearers at the opposite ends. The bearers cooperate with the underlying base or anvil roll to maintain proper clearance between the cutting edge of the die roll and the anvil roll surface. Whereas it is practical to precisely machine the die itself, inaccuracy is often introduced in setting-up the press, or develops during operation, because the opposite ends of the roll are subjected to unequal forces.

Accordingly, it is the primary object of the present invention to provide a novel device for transferring and monitoring the load applied to a die cutting roll so as to balance the forces transmitted thereto, to thereby achieve improved performance and prolonged die life.

It is also an object of the invention to provide such a device which can be utilized both during the setting-up procedure and also during operation of the press, to establish and maintain the desired balanced load upon the die roll.

Another object of the invention is to provide such a device which is relatively simple in design and inexpensive to manufacture, and which is nevertheless convenient to employ and highly effective for its intended purposes.

SUMMARY OF THE INVENTION

It has now been found that the foregoing and related objects of the invention are readily attained in a device for transferring and monitoring the load applied to a die cutting roll in a press, comprising a body adapted for mounting in the press, having load-bearing and pressure-indicating means therein. The means employed includes a load-bearing member disposed on one side of the body, for contact by force-applying means of the press, and a pressure indicator operatively connected to the load-bearing member. Means is also present on the body for transferring the applied force to a die cutting roll, mounted in the press to the side of the body opposite to that on which the load-bearing member is disposed.

In the preferred embodiments, the body will have a cavity formed into its "one" side and in fluid flow communication with the pressure indicator, and the load-bearing member will comprise a diaphragm mounted on the body in sealing relationship over the cavity, to provide a substantially closed chamber. The diaphragm will most desirably be a metal disc having a central boss and a circumferential shoulder portion, both defined by an annular recess formed into one side of the disc. The annular recess will provide a relatively flexible web portion, which will permit resilient displacement of the boss relative to the shoulder portion and into the chamber. Generally, the body will have a bore extending into the cavity, and the device will additionally include a piston mounted within the bore to seal it against fluid flow; the position of the piston in the bore will be adjustable to control the level of pressure within the chamber.

In certain embodiments, the body of the device will be an elongated block that is dimensioned and configured for mounting between the frame portions of the press, across the die cutting station thereof. In such instances, the load-bearing and pressure-indicating means will include a second load-bearing member and pressure indicator, disposed and connected as previously described, but with one of the load-bearing means adjacent each of the opposite ends of the block. Thus, the block will be adapted to receive a two-point force load, and to balance the forces transferred therethrough.

In some cases, the body will be adapted for use with an assist block interposed in the press between it and the die cutting roll, with the force-transferring means comprising the "opposite side" surface thereof. Alternatively, it may be designed for use alone, in which instance the force-transferring means will normally be adapted for establishing direct, rolling contact with the die cutting roll. As yet another alternative, the body will have an opening extending transversely thereinto from one side, to receive an end portion of an assist roll comprising the force-transferring means; a pair of such bodies will be used to support the opposite ends of the assist roll therebetween.

BRIEF DESCRIPTION OF THE DRAWINGS

FIG. 5 is a front elevational view of another embodiment of the invention, comprised of a pair of load monitoring devices and showing, in phantom line, a cooperating assist roll supported therebetween; and FIG. 6 is a sectional view of one of the devices shown in FIG. 5, taken along line 6—6 thereof.

DETAILED DESCRIPTION OF THE ILLUSTRATED EMBODIMENTS

Figure 1:
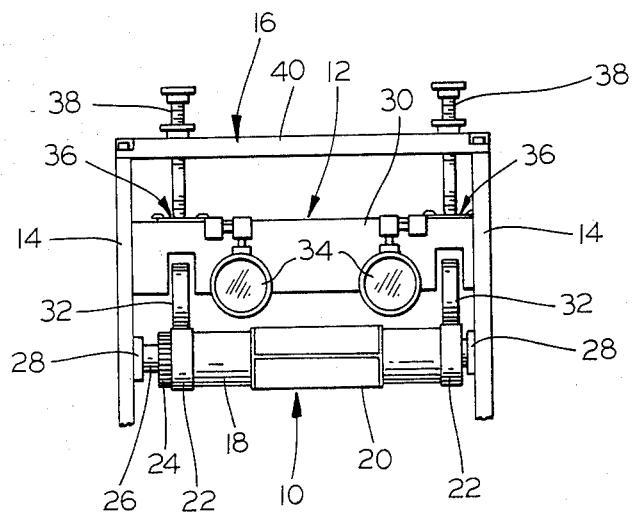
FIG. 1 is a front elevational view of a portion of the die-cutting station of a press, showing a device embodying the present invention installed in position over the die cutting roll.

Turning now in detail to FIG. 1 of the drawings, therein illustrated is a die cutting press in which is installed a die cutting roll, generally designated by the numeral 10, and a force monitoring device embodying the invention, generally designated by the numeral 12. Both are supported at their opposite ends by the side frame portions 14 of the press, across which extends a die pressure bridge, generally designated by the numeral 16, bolted thereto.

The die cutting roll 10 is of standard construction, and consists of a cylindrical body portion 18 on which is formed a cutting element 20, and adjacent each of the opposite ends of which is affixed an annular bearer 22. A gear for driving the die roll 10 is also affixed at one end of the shaft 26, and suitable bearing blocks 28 are provided for journalled support of the shaft 26 in the frame portions 14.

Although details of construction will be discussed more fully in connection with the subsequent figures, it will be noted in FIG. 1 that the monitoring device 12 consists of an elongated block body 30, in which is rotatably supported a pair of pressure rolls 32 for rolling contact with the bearers 22 of the die cutting roll 10. A pair of pressure gauges 34 are mounted on the body 30, and sensing caps, generally designated by the numeral 36, are disposed in the upper portion thereof in position beneath the die pressure screws 38; the latter are, in turn, mounted within the cross-piece 40 of the pressure bridge 16.

As will readily be appreciated, force applied by the two pressure screws 38 is transmitted to the die cutting roll 10 through the load monitoring device 12. One of the screws 38 is aligned over one of the pressure rolls 32 and one of the bearers 22 adjacent each of the opposite ends of the assembly; therefore, the forces exerted by the screws 38 must be substantially the same if the load across the die cutting roll 10 is to be balanced.

In accordance with the present invention, this is easily accomplished due to the fact that the gauges 34 provide an accurate indication of the magnitude of force applied to each of the sensing caps 36 by the screw 38 that acts upon it. By merely matching the pressure readings of the two gauges, the forces applied and transmitted to the die cutting roll 10, through the rolls 32 and the bearers 22, are readily balanced.

Figure 2:
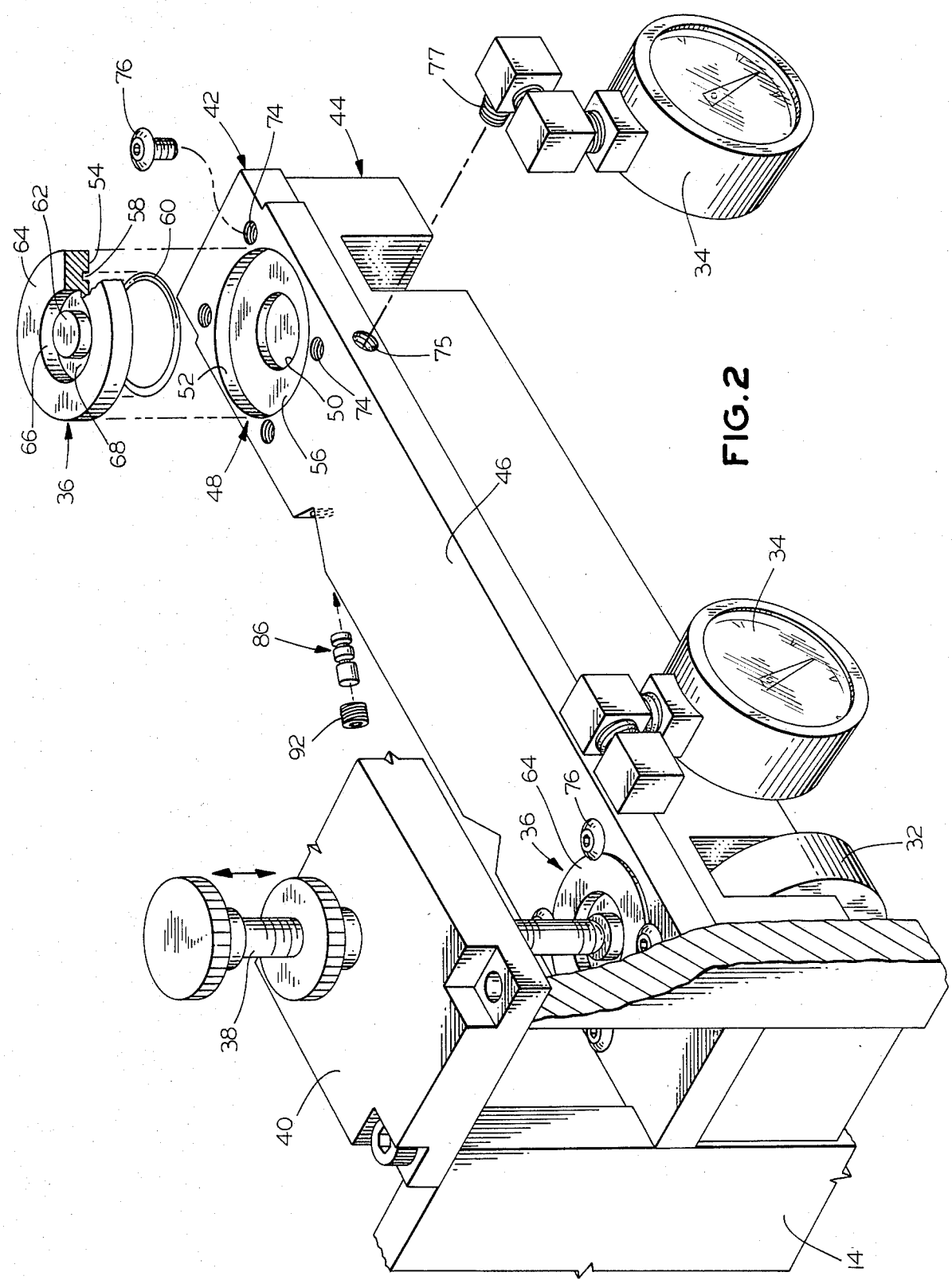
FIG. 2 is a fragmentary exploded perspective view showing a second embodiment of the devices of the invention, mounted in a press for cooperation with an assist block.

Although the monitoring device 12 illustrated in FIG. 1 may be regarded as incorporated in the body of an assist block, this need not be the case; the device 42, shown in FIG. 2, is a separate unit, that is designed for use in cooperation with a standard assist block 44. In terms of force monitoring and transmitting effects, the combination shown in FIG. 2 functions in virtually the same manner as does that of FIG. 1, and the details of construction shown are commonly applicable. Consequently, the same numbers are employed, where appropriate, to designate parts that are common to both embodiments. As will be appreciated, one of the pressure rolls 32 is removed from the unit shown in FIG. 2, for clarity of illustration.

The device 42 consists of an elongated plate 46, into the upper surface of which is formed a pair of compound cavities generally designated 48 (only one of which is visible), consisting of a lower chamber 50 and an upper annular portion 52. A pressure-sensing cap, generally designated 36, is seated within each of the compound cavities 48 with its bottom surface 54 in contact with the annular surface 56; the surface 54 has a circular groove 58 formed in it to receive the sealing ring 60, which bears upon the surface 56 to prevent leakage from the underlying chamber 50.

The cap itself consists of a central boss or button 62 and a circumferential shoulder portion 64, which are defined by an annular recess 66 formed therebetween. This produces an annular web portion 68 at the bottom of the recess 66, which is sufficiently thin to function as a pressure-responsive diaphragm. As will therefore be appreciated, force applied to the button 62 from the screw 38 will be transmitted to the plate 46; it will be also cause a slight deflection of the annular web 68, thereby increasing the pressure within the chamber 50.

The latter is connected to the corresponding guage 34 by one leg 70 of a passageway formed in the plate 46, with a hydraulic fluid filling the interior spaces. Thus, the magnitude of force applied by each of the two screws 38 to the opposite ends of the plate 46 will be caused to register on the associated gauges 34, thereby permitting the load across the plate 46, and hence upon the underlying die roll, to be readily balanced by observing the readings on the two gauges 34 as the pressure screws 38 are adjusted.

Figure 3:
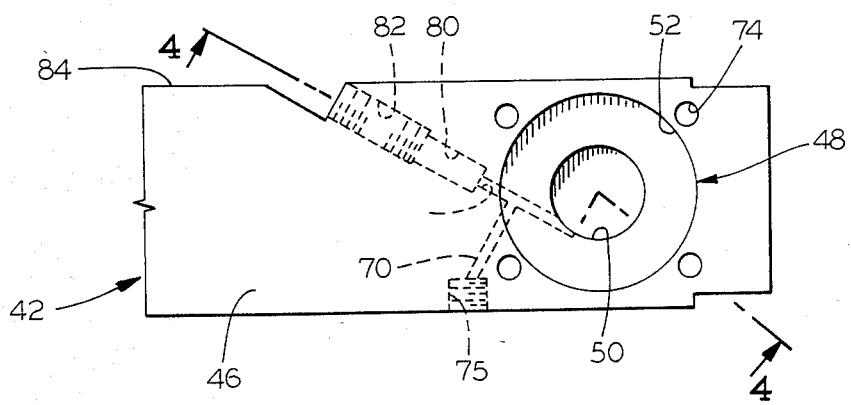
FIG. 3 is a fragmentary plan view of the right end portion of the device shown in FIG. 2.
Figure 4:
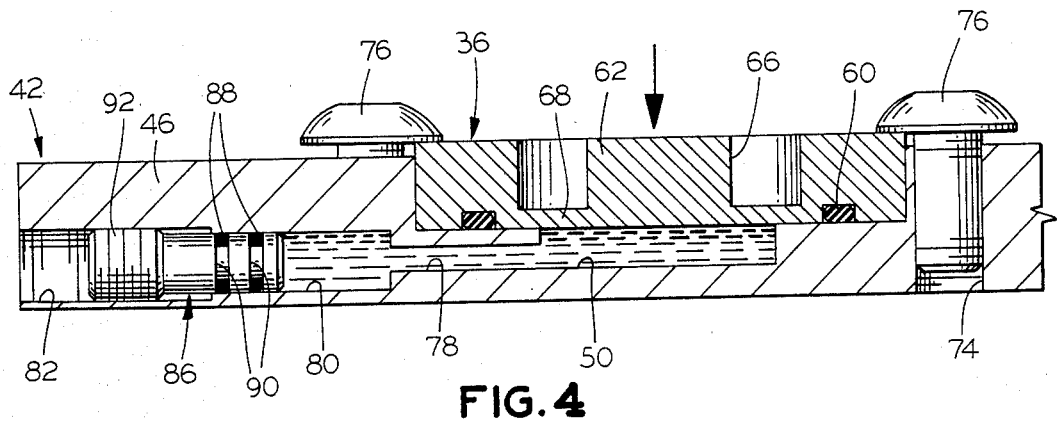
FIG. 4 is a fragmentary sectional view taken along line 4—4 of FIG. 3, drawn to a greatly enlarged scale.

As will be noted, the plate 46 has threaded apertures 74 formed thereinto, which receive four fasteners 76 to secure the caps 36 against disassembly. Each of the gauges 34 has a threaded nipple 77 on its mounting structure, which is engaged within a corresponding aperture 75 formed into the front surface of the plate 46. The internal construction of the plate 46, defining the hydraulic system by which the applied pressure is transmitted to the gauges 34, is best shown in FIGS. 3 and 4.

As can be seen therein, the chamber 50 is connected to the gauge 34 through the tangentially extending leg 78 and the connecting leg 70 of the internal passageway. The tangential leg 78 opens to an enlarged cylindrical section 80 which, in turn, joins a threaded outer portion 82; the latter terminates at the rear edge 84 of the plate 46. A piston, generally designated by the numeral 86, is slidably received within the cylindrical intermediate section 80 of the passageway, and has a pair of sealing O-rings 88 mounted in circumferential grooves 90 extending thereabout. A threaded adjustment screw 92 is engaged within the outer section 82 of the passageway, behind the piston 96 and in direct contact therewith.

The level of pressure on the hydraulic fluid contained within the chamber 50, and within the legs 70, 78 and intermediate section 80 of the internal passageway, is readily set to a predetermined value, by suitable adjustment of the screw 92. For example, the screw may be adjusted until the gauge 34 associated with that part of the system registers a zero pressure value. It will be appreciated that both halves of the system will normally be adjusted to cause the gauges to read the same in the absence of external force, and that the actual pressure level within the hydraulic system will not generally be of concern. The significant factor is, of course, that the gauges be calibrated to one another, so as to enable the increase in pressure on each side of the device 42 to be accurately monitored and matched, to enable a facile balancing of the forces applied by the screws 38.

Turning finally to FIGS. 5 and 6, a third embodiment of the devices of the invention is illustrated, and once again parts thereof that are common to the embodiments of the foregoing figures bear the same numbers. In this instance, two separate blocks, each generally designated by the numeral 94, are utilized to support therebetween an assist roller, shown in phantom line and generally designated by the numeral 96. For this purpose, each block has a relatively large bore 98 extending transversely therethrough, in which is journalled one of the ends of the roll 96; a set-screw 100, received in an elongated threaded aperture 101 extending inwardly from the rear of the block 94, bears upon a surface flat and retains the end of the roller in position therewithin.

Although a similar piston 86 and cooperating adjustment screw 92 are used in each of the blocks 94 to adjust the pressure within the chamber 50 beneath the cap 36, in this instance the configuration of the internal passageway is somewhat different, to accommodate the difference in the design and construction of the load monitoring device itself. More particularly, the two legs 70, 78 thereof are axially aligned, and extend substantially from the front to the rear of the block 94, with the chamber 50 disposed therebetween. Nevertheless, it will be appreciated that the assembly of FIG. 5 will be used and will function in substantially the same manner as the devices heretofore described. The force applied by the screws 38 to the caps 36 on each of the blocks 94 will be transferred to an underlying cutting roll 10 by the assist roll 96, through its end bearers 102, with the levels of force applied at each end of the assembly being indicated by the two gauges 34.

Although three embodiments of the present device, and specific arrangements of the parts thereof, have been illustrated, it will be appreciated that changes and substitutions can be made without departing from the concepts of the invention. For example, while specific forms of pressure sensing and indicating devices have been described others, such as of a digital or like electronic nature, might be employed instead. Also, while the primary function of the present apparatus is to facilitate balancing of the applied forces, it may also be used as a pressure indicating device, in a more absolute sense. For example, by designating a maximum permissible reading for the pressure indicators, overloading of the die can be prevented.

Thus, it can be see that the present invention provides a novel device for transferring and monitoring the load applied to a die cutting roll, so as to balance the forces transmitted thereto, to thereby achieve improved performance and prolonged die life. The device can be utilized both during the setting-up procedure and also during operation of the press, to establish and maintain the desired balanced load upon the die roll. The device is of relatively simple design, convenient to utilize, and inexpensive to manufacture, and is nevertheless highly effective in achieving the objectives of the invention.

Having thus described the invention, what is claimed is:

1. A device for transferring and monitoring the load applied to a die cutting roll in a press, comprising an elongated body dimensioned and configured for mounting between the frame portions of the press across the die cutting station thereof, and having load-bearing and pressure-indicating means therein, said means including a pair of load-bearing members disposed adjacent the opposite ends of said body and on one side thereof for contact by force-applying means of the press, and a pair of pressure indicators, one operatively connected to each of said load-bearing members, said body also having means for transferring the applied force to a die cutting roll mounted in the press to the opposite side of said body, whereby said body is adapted to receive a two-point load and to enable balancing of the forces transferred therethrough.

2. The device of claim 1 wherein said body is adapted for use with an assist block interposed in the press between it and the die cutting roll, said force-transferring means comprising the surface of said body on said opposite side thereof.

3. The device of claim 1 wherein said body is adapted for use without an assist block, said force-transferring means being disposed adjacent said opposite side of said body, and being adapted for establishing direct rolling contact with the die cutting roll.

4. A device for transferring and monitoring the load applied to a die cutting roll in a press, comprising a body adapted for mounting in the press and having load-bearing and pressure indicating means therein, said means including a load-bearing member disposed on one side of said body for contact by force-applying means of the press, and a pressure indicator operatively connected thereto, said body having a cavity formed into said one side thereof in fluid flow communication with said indicator, and said load-bearing member comprising a diaphragm mounted upon said block in sealing relationship over said cavity, to provide a substantially closed chamber, said body also having means for transferring the applied force to a die cutting roll mounted in the press to the opposite side thereof.

5. The device of claim 4 wherein said diaphragm is a metal disc having a central boss and a circumferential shoulder portion defined by an annular recess formed into one side of said disc, said recess providing a relatively flexible web portion permitting resilient displacement of said boss relative to said shoulder portion and into said chamber.

6. The device of claim 4 wherein said body has a bore extending from an exterior location thereon into said chamber, and wherein said device additionally includes a piston mounted within said bore to seal the same against fluid flow, the position of said piston in said bore being adjustable to control the level of pressure within said chamber.

7. A device for transferring and monitoring the load applied to a die cutting roll in a press, comprising a body adapted for mounting in the press and having load-bearing and pressure indicating means therein, said means including a load-bearing member disposed on one side of said body for contact by force-applying means of the press, and a pressure indicator operatively connected thereto, said body also having means for transferring the applied force to a die cutting roll mounted in the press to the opposite side thereof, and having an opening extending transversely thereinto, said opening being adapted to support one end of an assist roll comprising said force-transferring means of said body, said body being adapted for use with a corresponding body at the opposite end of the assist roll for supporting the roll therebetween.

* * * * *